US008600456B2

(12) United States Patent
Meier et al.

(10) Patent No.: US 8,600,456 B2
(45) Date of Patent: Dec. 3, 2013

(54) UNIFORM POWER SAVE METHOD FOR WIRELESS STATIONS

(75) Inventors: Robert C. Meier, Cuyahoga Falls, OH (US); Mark Bilstad, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1087 days.

(21) Appl. No.: 11/780,189

(22) Filed: Jul. 19, 2007

(65) Prior Publication Data

US 2007/0259700 A1 Nov. 8, 2007

Related U.S. Application Data

(62) Division of application No. 10/626,214, filed on Jul. 24, 2003, now Pat. No. 7,551,948.

(51) Int. Cl.
*H04B 1/38* (2006.01)
*H04W 72/00* (2009.01)

(52) U.S. Cl.
USPC .......................................... 455/574; 455/453

(58) Field of Classification Search
USPC ............... 455/574, 347, 90.3; 709/223, 201; 248/309.1–316.8; 312/7.1
See application file for complete search history.

(56) References Cited

U.S. PATENT DOCUMENTS

| | | | | |
|---|---|---|---|---|
| 5,958,018 | A * | 9/1999 | Eng et al. | 709/246 |
| 6,701,361 | B1 * | 3/2004 | Meier | 709/224 |
| 7,051,103 | B1 * | 5/2006 | Giroir et al. | 709/227 |
| 7,274,929 | B1 * | 9/2007 | Banginwar | 455/418 |
| 2002/0193073 | A1 | 12/2002 | Fujioka | |
| 2003/0055929 | A1 * | 3/2003 | Ding et al. | 709/223 |
| 2003/0076804 | A1 | 4/2003 | Sivalingham | |
| 2003/0088700 | A1 | 5/2003 | Aiken | |
| 2004/0264397 | A1 | 12/2004 | Benveniste | |

FOREIGN PATENT DOCUMENTS

| | | |
|---|---|---|
| EP | 1 052 867 | 11/2000 |
| EP | 1 182 846 | 2/2002 |

OTHER PUBLICATIONS

Mathilde Benveniste; "Proposed Normative Text for Simplified APSD"; IEEE P802.11; Wireless LANs; Jan. 2003; pp. 1-4.
Draft Supplement to Standard for Telecommunications and Information Exchange Between Systems-LAN/MAN Specific-Requirments-Part 11: Wireless Medium Access Control (MAC) and Physical, May 2003.
Layer (PHY) Specifications: Medium Access Control (MAC) Enhancements for Quality of Service (QoS); IEEE Std. 802.11e/D4.3; May 2003.
U.S. Appl. No. 60/433,604, filed Dec. 16, 2002, Benveniste.
U.S. Appl. No. 60/441,160, filed Jan. 21, 2003, Benveniste.
U.S. Appl. No. 60/497,556, filed Aug. 26, 2003, Benveniste.
XP-002307288, "Part 11: Wireless LAN Medium Access Control (MAC) and Physical Layer (PHY) specifications", IEEE Std 802.11-1997.
European Search Report for European Application No. 04 75 5537.

* cited by examiner

*Primary Examiner* — Kwasi Karikari
*Assistant Examiner* — Emem Stephen
(74) *Attorney, Agent, or Firm* — Tucker Ellis LLP

(57) ABSTRACT

A Proxy ARP Server in an AP maintains IP/MAC bindings for associated clients. In an example embodiment, when the AP receives a proxy ARP request for a client, the AP may respond for the client. In another example embodiment, when the AP receives a proxy ARP request for the client, the AP buffers the request until the client is in an awake state. Optionally, the AP may convert the broadcast destination MAC address in the ARP request to a unicast address that corresponds to the target IP address.

12 Claims, 5 Drawing Sheets

UNIFORM POWER SAVE METHOD FOR WIRELESS STATIONS

CROSS-REFERENCE TO RELATED APPLICATIONS

This application is a Divisional Application of U.S. application Ser. No. 10/626,214 filed on Jul. 24, 2003 now U.S. Pat. No. 7,551,948.

BACKGROUND OF THE INVENTION

Wireless stations tend to be portable, battery operated devices. Because these devices are battery operated, it is desirable to minimize power consumption. Minimizing power consumption prolongs battery life and extends the time period before a battery needs to be recharged or replaced.

OVERVIEW OF EXAMPLE EMBODIMENTS

The following presents a simplified summary of the example embodiments in order to provide a basic understanding of some aspects of the example embodiments. This summary is not an extensive overview of the example embodiments. It is intended to neither identify key or critical elements of the invention nor delineate the scope of the invention. Its sole purpose is to present some concepts of the example embodiments in a simplified form as a prelude to the more detailed description that is presented later.

In an example embodiment, there is disclosed herein a method, comprising receiving the broadcast Address Resolution Protocol request on a wired port. The method further comprises searching at least one of Internet Protocol bindings and Media Access Control bindings for an Internet Protocol address by matching a target Internet Protocol address contained in the broadcast Address Resolution Protocol request. A reply is sent to the broadcast Address Resolution Protocol request, the reply comprising a Media Access Control address that corresponds to the target Internet Protocol address.

In an example embodiment, there is disclosed herein an access point, comprising a proxy Address Resolution Protocol server, a memory associated with the Address Resolution Protocol server comprising Internet Protocol bindings and Media Access Control bindings for an Internet Protocol address and an Ethernet port in data communication with the Address Resolution Protocol server. The proxy Address Resolution Protocol server is responsive to a broadcast Address Resolution Protocol request received on the Ethernet port, the request comprising a target Internet Protocol address, to search the memory for at least one of Internet Protocol bindings and Media Access Control bindings for an Internet Protocol address by matching the target Internet Protocol address contained in the broadcast Address Resolution Protocol request. The proxy Address Resolution Protocol server is configured to send a reply to the broadcast Address Resolution Protocol request, the reply comprising a Media Access Control address that corresponds to the target Internet Protocol address.

In an example embodiment, there is disclosed herein a method, comprising receiving the broadcast Address Resolution Protocol request on a Ethernet port for a target station in wireless data communication, the request comprising a destination broadcast Media Access Control address and a target Internet Protocol address, and searching at least one of Internet Protocol bindings and Media Access Control bindings for an Internet Protocol address matching a target Internet Protocol address contained in the broadcast Address Resolution Protocol request. The method further comprises translating the destination broadcast Media Access Control address to a unicast Media Access Control address corresponding to the target Internet Protocol address and forwarding the request to the target station. The access point indicates to target stations that it is providing an proxy Address Resolution Protocol service to inform a power-save target station that it does not have to stay awake to receive all broadcast and multicast downlink transmissions from the access point.

In an example embodiment, there is disclosed herein an access point, comprising a proxy Address Resolution Protocol (ARP) server, a memory associated with the Address Resolution Protocol server comprising Internet Protocol bindings and Media Access Control bindings for an Internet Protocol address, an Ethernet transceiver in data communication with the proxy Address Resolution Protocol server, and a wireless transceiver in data communication with the proxy Address Resolution Protocol. The proxy Address Resolution Protocol server is responsive to a broadcast Address Resolution Protocol request for a target station in data communication with the wireless transceiver, the request comprising a destination broadcast Media Access Control address and a target Internet Protocol address, to search the memory for at least one of Internet Protocol bindings and Media Access Control bindings for an Internet Protocol address matching a target Internet Protocol address contained in the broadcast Address Resolution Protocol request. The proxy Address Resolution Protocol server is configured to translate the destination broadcast Media Access Control address to a unicast Media Access Control address corresponding to the target Internet Protocol address. The proxy Address Resolution Protocol is configured to forward the request to the target station through the wireless transceiver.

BRIEF DESCRIPTION OF THE DRAWINGS

The accompanying drawings incorporated in and forming a part of the specification, illustrates several aspects of the present invention, and together with the description serve to explain the principles of the invention. In the drawings.

DESCRIPTION OF EXAMPLE EMBODIMENTS

This description provides examples not intended to limit the scope of the invention, as claimed. The figures generally indicate the features of the examples, where it is understood and appreciated that like reference numerals are used to refer to like elements As used throughout this specification, unless otherwise explicitly defined, the following terms are defined as follows:

AP—802.11 access point;

Burst—a sequence of frames sent in rapid succession following a single channel access;

CODEC—A voice Coder/Decoder, including any support software;

Downlink—from the AP to a client station;

Uplink—from a client station to the AP;

Silence Suppression—A method where a voice CODEC automatically determines when the local speaker is idle, during an interactive voice session, and automatically is suppresses packet transmissions during such idle periods;

Voice station—An 802.11 client station that contains an interactive voice application, where a Voice CODEC converts periodic analog voice samples into a digital, packetized voice communications stream;

Wakeup State—A transient state in a Power-save station, where the station can receive downlink transmissions;

Doze State—A transient state in a Power-save station, where the station cannot receive downlink transmissions; and Power-save (PS) station—A station that is alternating between the transient Wakeup and Doze states according to a predetermined set of rules.

While the specification of the present invention often refers to a Quality-of-Service Station (QSTA) and a Quality-of-Service Access Point (QAP), as those skilled in the art can readily appreciate the present invention are adaptable to all types of wireless stations and access points respectively. Furthermore, while the example embodiments disclosed herein are directed to 802.11 networks, they are suitable for any type of wireless networking.

Figure 1:
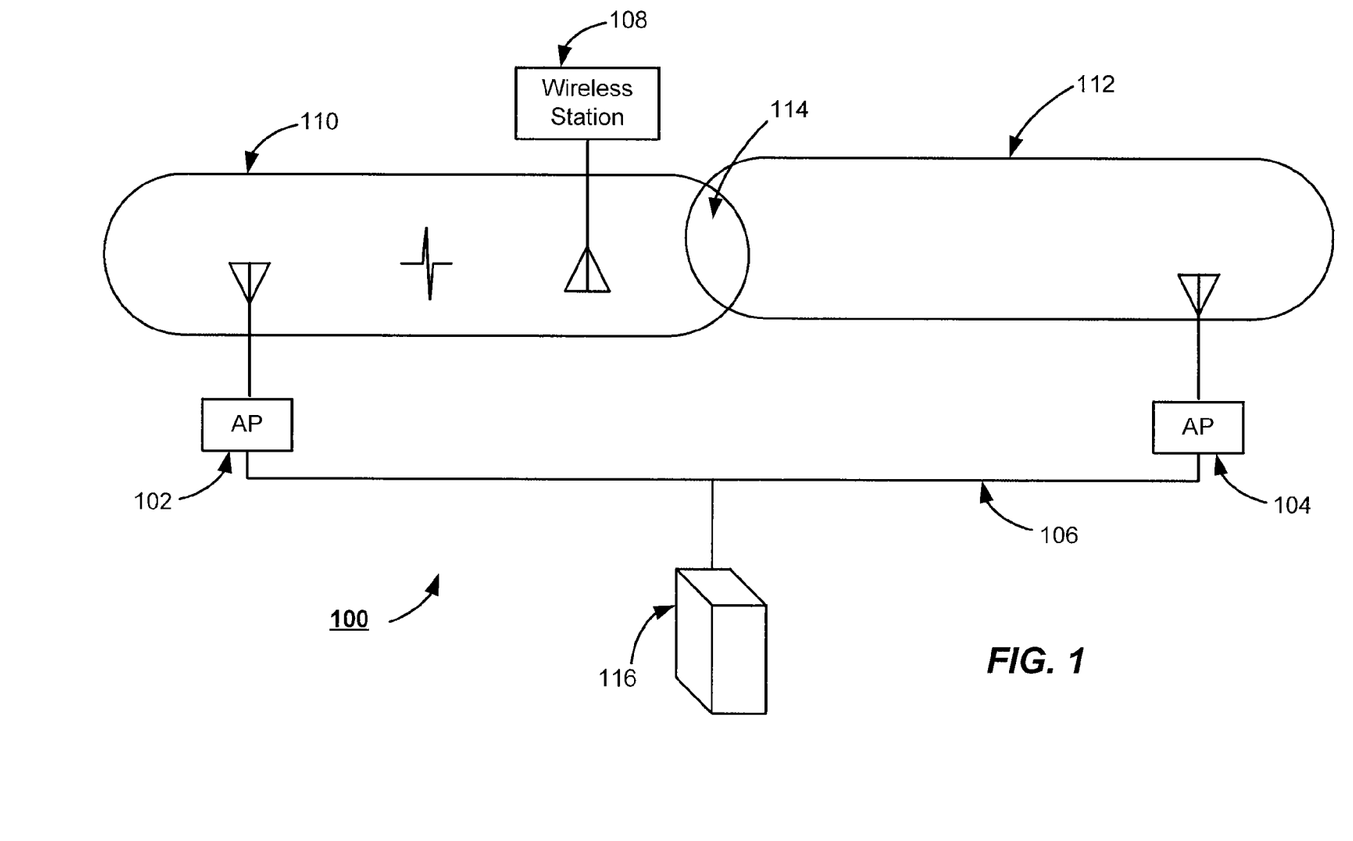
FIG. 1 is a block diagram showing the typical components of an 802.11 network.

Referring first to FIG. 1 there is illustrated a block diagram of a typical 802.11 network 100. The network 100 comprises two access points 102 and 104. Access Point 102 has a coverage area 110 and Access Point 104 has a coverage area 112. An overlap area 114 exists between coverage area 110 and coverage area 112. A wireless station 108 is shown as being within Access Point 102's coverage area 110. The wireless station 108 may travel between Access Point 102's coverage 110 and Access Point 104's coverage area 112, a process typically known as roaming. Usually when wireless station 108 roams from coverage area 110 to coverage area 112, it will change which access point it associates while passing through the overlap area 114. A backbone 106 is used to connect Access Point 102 and Access Point 104. Typically the backbone is a wired network connection, such as Ethernet, however any suitable means, wired or wireless, and any standard networking protocol, may be used. An authentication server 116 is also shown connected to backbone 106. Ordinarily the authentication server is used by an access point to authenticate wireless station 108 when it first associates with an access point, such as Access Point 108. While the aforementioned network 100 shows two access points and a single wireless station, as those skilled in the art can readily appreciate the network may comprise an any number of access points and any number of wireless stations.

Figure 2:
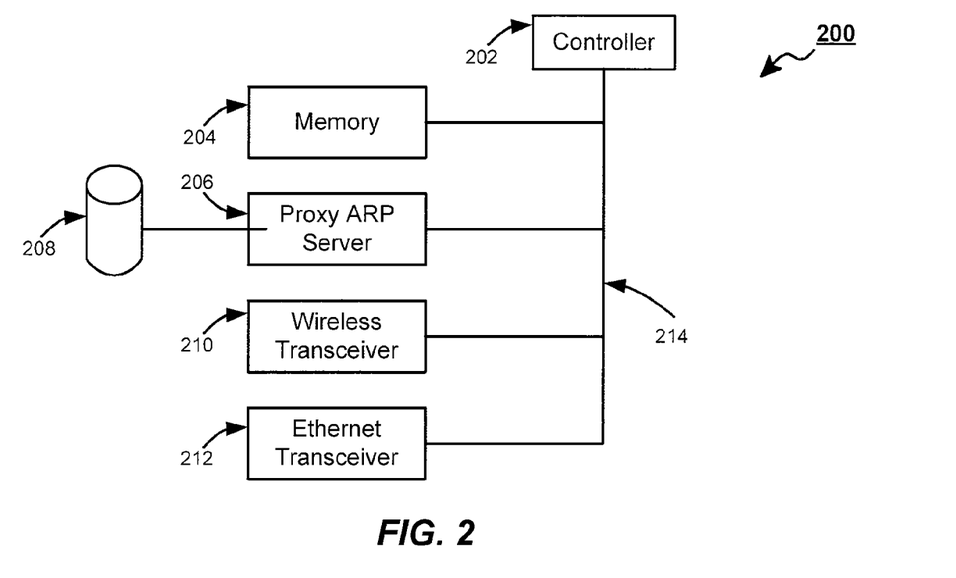
FIG. 2 is a block diagram of the components of an Access Point contemplated by an embodiment of the present invention.

Referring now to FIG. 2 there is illustrated the typical component parts of an access point 200 as contemplated by the present invention. The access point 200 has a controller 202 for controlling the operations of the access point 200. Typically, the controller 202 is microprocessor based. Memory 204 is used by the controller 202 for storage. Memory 204 may be comprised of Random Access Memory (RAM), Read Only Memory (ROM), Non-Volatile Random Access Memory (NVRAM), other types of memory and combinations thereof. The typical access point 200 comprises a wireless transceiver 210 and an Ethernet transceiver 212. The wireless transceiver 210 is used to send and receive messages with wireless stations. The Ethernet transceiver 212, for sending and receiving messages along the backbone (106—FIG. 1) between access points. The access point 200 in this example also comprises a Proxy ARP server 206 with its own memory 208. The Proxy ARP server 206 may be implemented in software, hardware, or a combination thereof. The storage 208 may comprise disk type memory, RAM, or other memory which is used for storing IP and MAC bindings for wireless stations associated with the access point 200. It is also possible that the Proxy ARP Server may share memory 204 with the Controller 202 instead of having its own separate memory 208.

One aspect of an example embodiment is a polled+EDCF access method that combines polled and EDCF channel access. Another aspect of an example embodiment is a Scheduled Wakeup Time power-save method that can replace the current 802.11e Schedule method and encompasses the 802.11e APSD method. The distributed TSF timer is used to synchronize wakeup times. Another aspect of an example embodiment is that consistent power-save state transition rules are defined. A QSTA can set the More Data bit in a QoS frame to initiate unscheduled wakeup periods (i.e. to indicate that it has frames buffered for transmission).

Another aspect of an example embodiment is that the error recovery rules for Hybrid Coordination Function (HCF) polling are simplified and are more robust. HCF and, optionally, EDCF QSTAs can establish wakeup periods with arbitrary start times and application-specific periods. A QAP can implement a single, simple timer mechanism that supports both power-save scheduling and periodic polling. Furthermore, a QAP can implement polling for power-save "beaconing" purposes without implementing more complex error recovery for polled access. Less data is crowded into periods immediately following Beacon transmissions. QSTAs that are scheduled for HCF polling can use EDCF to minimize latency. Polling can be used to arbitrate EDCF contention. By using the present invention, uplink and downlink transmissions can be interleaved so that the channel is used more efficiently.

Figure 3:
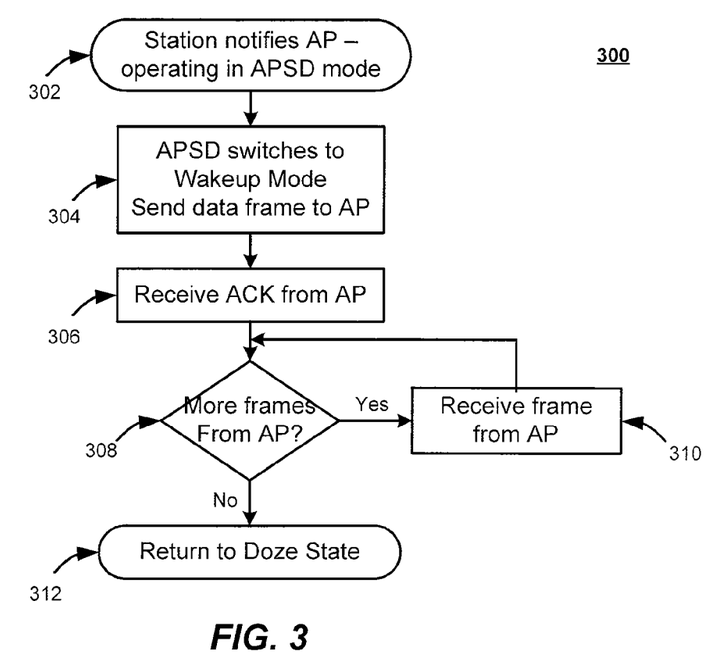
FIG. 3 is a block diagram showing the steps of a method contemplated by the present invention.

Referring now to FIG. 3, there is illustrated the steps of a method 300 contemplated in an example embodiment. The method 300 begins at step 302 when a station notifies an AP that the station is operating in APSD mode. If there are no uplink or downlink frames being buffered, the station would then go to a doze state (not shown). At step 304 the station switches to wakeup mode and sends a data frame to the AP. The station then waits and at step 306 receives an Acknowledgement (ACK) from the AP. The ACK would have either a flag set or a more data bit to indicate whether the AP has more frames for the station. At step 308 the flag or more bit is examined to determine whether the AP has more frames for the station. If there are more frames, then as shown at step 310 the station receives a frame from the AP. Processing then returns back to step 308. When at step 308 it is determined that there are no more frames waiting at the AP, then at step 312 the station returns to a doze state.

Figure 4:
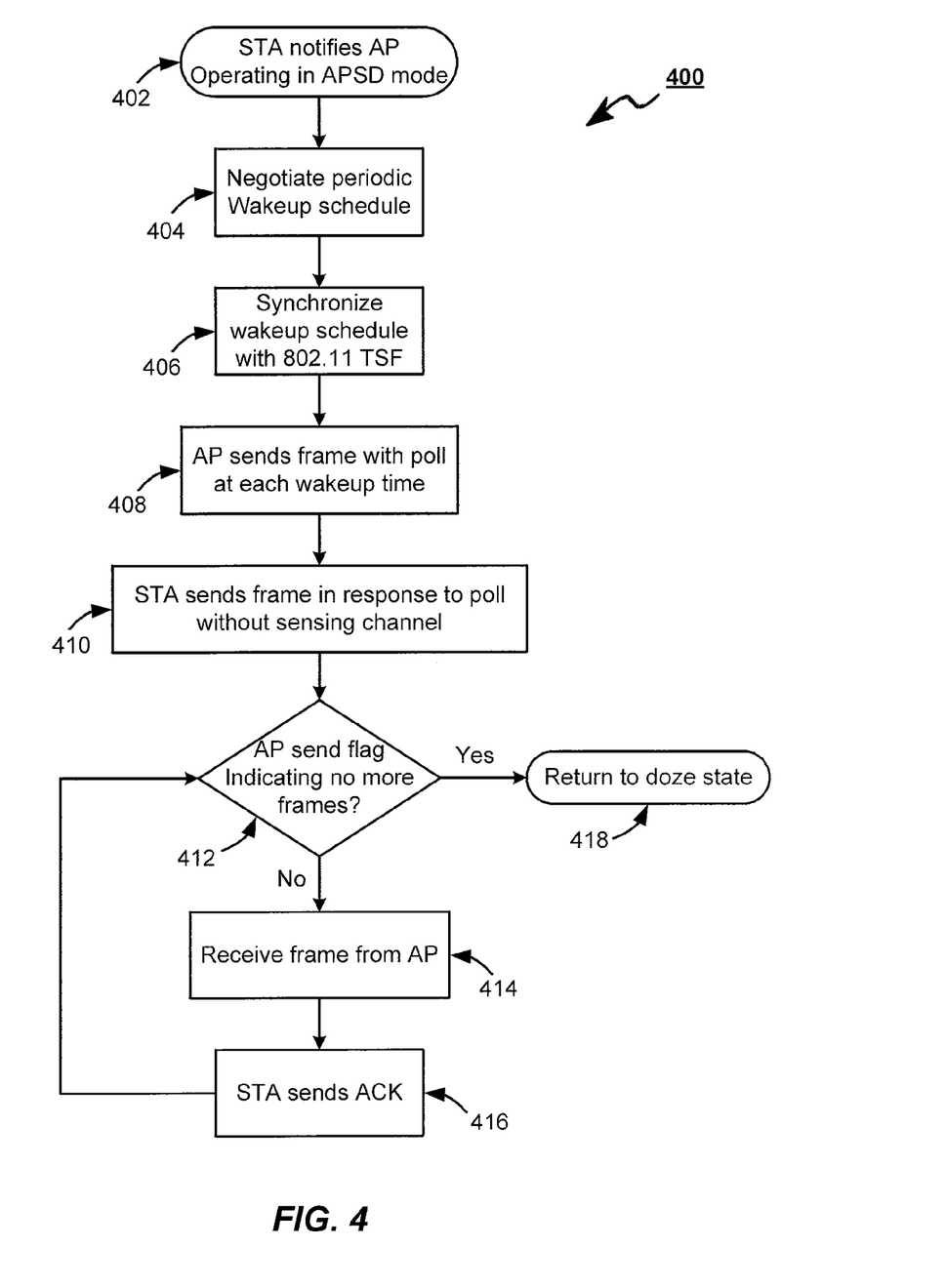
FIG. 4 is a block diagram showing the steps of a method contemplated by the present invention.

Method 400 in FIG. 4 illustrates another example embodiment. At step 402, a station notifies an AP that it is operating in an automatic power-save delivery (APSD) mode. At step 404 the station and the AP negotiate a periodic wakeup schedule. At step 406 the wakeup schedule is synchronized with the 802.11 Timer Synchronization Function (TSF). At step 408 the AP sends a frame with a poll at each scheduled wakeup time. At step 410 the station sends a frame in response to the poll without first sensing the channel to determine if the channel is idle. The station then determines if the poll sent in step 408 has a flag set to indicate it has a buffered downlink frame for the station.

If at step 412 the AP has frames, then at step 414 the station receives the frame from the AP and an ACK is sent at step 416. Step 412 is repeated, this time examining the frame sent from the AP to determine if the AP has another frame for the station. If the AP does have another frame for the station, then steps 414 and 416 are repeated. When at step 412 it is determined that the AP has no more frames for the station, then the station returns to a doze state as shown in step 418.

In an example embodiment, Polled+EDCF access is defined by the following rules:
1) A QSTA, which has established periodic polling for a traffic stream, may use EDCF access to transmit an uplink frame for the traffic stream. It may also use EDCF access to retransmit an uplink frame, if an expected (QoS) ACK is not received.
2) If a QSTA transmits an uplink frame in response to a poll, and it does not receive an expected ACK, then it must increment its Retry Count for the respective Access Category and execute a post-TX backoff, before retransmitting the frame with EDCF access.
3) A QSTA can transmit, at most, 1 uplink data frame in response to a poll from the QAP. The uplink frame may consist of multiple fragments.
4) A QAP enables uplink bursting with polled access by sending a QoS (+)CF-Poll to a QSTA when it receives an uplink QoS frame with the More Data bit set to '1' or with a non-zero queue size.
5) A QAP can, optionally, retransmit a poll frame if it does not receive an expected response; however, a QAP should not exhaustively retransmit polls to a power-save station that may have returned to the "Doze" state.

Rule 3 supra resolves the ambiguity in the error recovery rules for polled access. In a common collision scenario, both the QAP and QSTA will repeatedly retransmit after the channel is idle for a PIFS time, causing repeated collisions.

Figure 5:
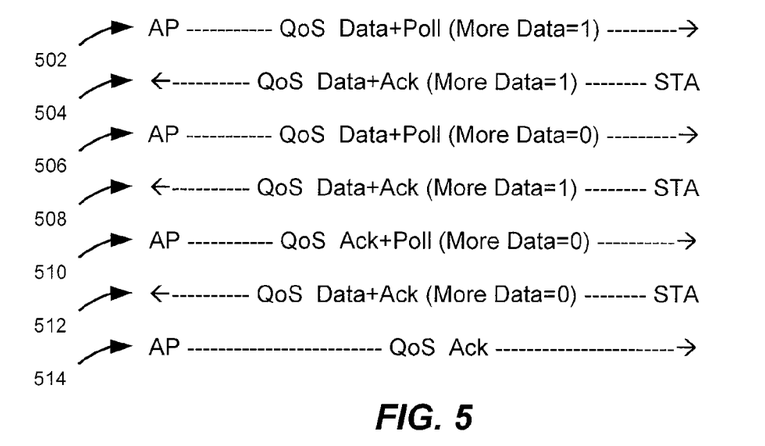
FIG. 5 is an example frame exchange sequence using polled+EDCF access.

An example frame exchange sequence, using the above rules, is shown in FIG. 5. Note that rule 3 does NOT prevent a QSTA from bursting uplink frames because the QAP can poll for successive uplink frames. At step 502 an AP sends to the station QoS data, and a poll with an acknowledgement (ACK) with the more data flag set to indicate it has additional downlink frames for the station. In this scenario, the station also has an uplink frame for the AP, so at step 504 the station sends to the AP QoS data and an ACK with the more data flag set to indicate it has another uplink frame for the AP. At step 506 the AP sends QoS Data and a poll, but this time with the more data flag set off. The station responds at step 508 with QoS data and an ACK with the more data flag set. At step 510 the AP only sends to the station a QoS ACK and a poll. The AP indicated at step 506 it had no more data for the station so it only sends the QoS ACK and the poll. When the station receives the ACK, at step 512 it sends to the AP QoS Data and an ACK, however this time the more data flag is set to off. Therefore, at step 514 the AP sends a QoS ACK to the station and the transmissions between the AP and station are completed. In a preferred embodiment, the AP senses if the channel is idle only before step 502, and no further channel idle sensing is performed by either the AP or the station after step 502.

Figure 6:
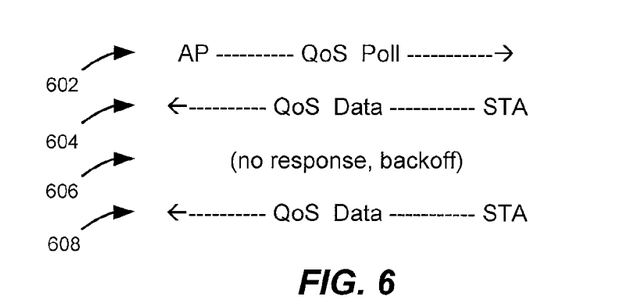
FIG. 6 is an example frame exchange sequence using polled+EDCF access wherein a station executes a post-TX back-off and uses EDCF to send an uplink frame after an expected ACK is not received.

In the example sequence shown in FIG. 6, a station (QSTA) executes a post-TX backoff and uses EDCF to send an uplink frame after an expected ACK is not received. The process starts at step 602 when the AP sends a QoS poll to the station. At step 604 the station sends QoS data to the AP. At step 606 the station determines it has not received a response to the QoS data sent in step 604 and begins a post-TX back-off. Then at step 608 the station senses the channel idle following the post-TX back-off and uses EDCF to send the QoS Data (uplink) frame.

As those skilled in the art can readily appreciate, the Polled+EDCF access method is useful for both power-save and active stations. For active stations, the Polled+EDCF access mechanism can be used to minimize latency on a lightly to moderately loaded channel and to arbitrate EDCF contention during periods of congestion: A QSTA can use 802.11e TSPEC signaling to establish a "Service Schedule". The QAP can start a poll timer, for a QSTA in active mode, with a period that is marginally longer that the Service Schedule period. The poll timer can be restarted each time that a set of 1 or more uplink frames is received from the QSTA. If the poll timer expires, because the QSTA did not send an uplink frame, then the QAP can poll the QSTA (i.e. to arbitrate contention). For power-save QSTAs, the Polled+EDCF access mechanism can be used to generate periodic polls at the start of a "Wakeup Period". The periodic polls function much like per-QSTA Beacons, because they enable a QSTA to immediately return to a Doze state, in the absence of other traffic. For example, a QSTA can wake up at its scheduled Wakeup Time, received a poll, and immediately return to the Doze state if a flag in the poll indicates that the AP does NOT have any downlink frames buffered for the QSTA.

Another aspect of an example embodiment is an extension to the current APSD mechanism where a QSTA can establish periodic scheduled Wakeup Times that may or may not be aligned with Beacon transmissions. A QSTA must be awake at each scheduled Wakeup Time and it must remain awake with the same rules as for the current APSD mechanism. A "scheduled Wakeup Period" starts at the scheduled Wakeup Time and ends when the QSTA receives a downlink frame with the More Data bit set to '0' or it receives a Beacon with its TIM bit set OFF. The QAP establishes the "Start Time" of a periodic Wakeup Time schedule as a TSF timer value, and establishes a Wakeup Period as an integer multiple of TSF timer ticks. The QAP can establish non-overlapping wakeup schedules for multiple stations to minimize contention and to minimize the time that a QSTA must stay awake. Wakeup Period synchronization between the QAP and a QSTA is achieved via normal TSF timer synchronization; therefore, the mechanism solves the synchronization issue associated with the current 802.11e Service Schedule mechanism. Note that an AP and all associated stations share a single, distributed TSF timer.

The "Wakeup Time" mechanism described herein is an extension of the enhanced APSD mechanism described in 802.11 document 03/107r1. The proposed Wakeup Time mechanism integrates the 03/107r1 mechanism with TSPEC signaling and supports "unscheduled Wakeup Periods". The changes for the Wakeup Time mechanism are listed below:
1) The APSD Schedule element defined in document 03/107r1 replaces the Schedule element in the current 802.11 draft is replaced.
2) A QSTA that uses TSPEC signaling to establish periodic polling does not need to request a schedule with an APSD Request element (as proposed in document 03/107). Instead, a QAP can derive a schedule from TSPEC parameters and asynchronously send an APSD Schedule element to establish a Wakeup Schedule for such a power-save QSTA.

3) The APSD signaling mechanism can, optionally, be extended, as described in document 03/107r1, so that a QSTA can request scheduled Wakeup Times without TSPEC signaling. The QAP can override the requested schedule with the APSD Schedule element.
4) A QSTA can initiate an unscheduled Wakeup Period at any time by sending an uplink QoS frame with the More Data bit set to '1'.
5) A QAP can initiate an unscheduled Wakeup Period by sending a downlink QoS (i.e. ACK) frame with the More Data bit set to '1'.
6) An 802.11 WakeupWaitTime parameter can, optionally, be set to the time that a station should wait before transmitting an uplink frame at each scheduled Wakeup Time.
7) A QSTA that has established scheduled Wakeup Periods can also send PS-Poll frames.

As described in document 03/107r1, scheduled Wakeup Times may or may not be aligned with Beacon transmission times, and the inter-Wakeup-Time period may or may not be an integer multiple of Beacon periods. A QAP can easily translate Beacon-based wakeup parameters into time-based parameters. Note that a QSTA can use the APSD mechanism as defined in the current 802.11e draft to establish Wakeup Times that are aligned with Beacon transmissions.

The following definitions are used to define power-save state transitions: A "Wakeup Period" is a period of time where a QAP can transmit data and or poll frames to a power-save QSTA. A Wakeup Period starts at a "Wakeup Time". A "scheduled Wakeup Period" follows a "scheduled Wakeup Time". A non-AP QSTA can initiate an "unscheduled Wakeup Period" at any time. A power-save QSTA is in a "Wakeup" state during a Wakeup Period. A power-save QSTA that is not in the Wakeup state is in the "Doze" state. Note that both the QAP and QSTA must agree on the QSTA's power-save state. The following rules for power-save operation with the Wakeup Time mechanism are contemplated in an example embodiment:

1) A QSTA that is operating in "active" mode is never in the Wakeup or Doze states. Any existing Wakeup Time schedule is deleted when a QSTA transitions to active mode.
2) A wakeup schedule established by the QAP, with an APSD Schedule element, overrides any existing schedule (e.g. established with an APSD request).
3) If a periodic wakeup schedule is established for a power-save QSTA, then the QSTA automatically transitions to the Wakeup state at each scheduled Wakeup Time.
4) A QSTA in the Doze state transitions to the Wakeup state each time that it transmits an uplink QoS frame with the More Data bit set '1'.
5) A QSTA in the Doze state transitions to the Wakeup state if it receives a downlink QoS frame (i.e. an ACK frame) with the More Data bit set to '1'.
6) If a QSTA does not receive the ACK for an uplink QoS frame, and all successive retransmission of the uplink frame, then it transitions to the Wakeup state.

The rules for terminating a scheduled or unscheduled Wakeup Period are as follows:

7) A QSTA in a scheduled Wakeup Period or an unscheduled Wakeup Period initiated by the QAP transitions to the "Doze" state when it receives a frame from the QAP with the More Data bit set to '0' or a TIM with its Association ID (AID) bit set to '0'.
8) A QSTA in a self-initiated unscheduled Wakeup Period transitions to the Doze state after it sends an uplink frame with the More Data bit set to '0' and then either receives a downlink frame with the More Data bit set to '0' or receives a Beacon with its TIM bit set to '0'.
9) If Wakeup Periods overlap, then the periods are aggregated and terminate at the same time with the aggregate set of rules. For example, if an unscheduled Wakeup Period initiated by a non-AP QSTA overlaps into a scheduled Wakeup Period, then both wakeup periods end after both the QAP and QSTA send a frame with the More Data bit set to '0'.

Figure 7:
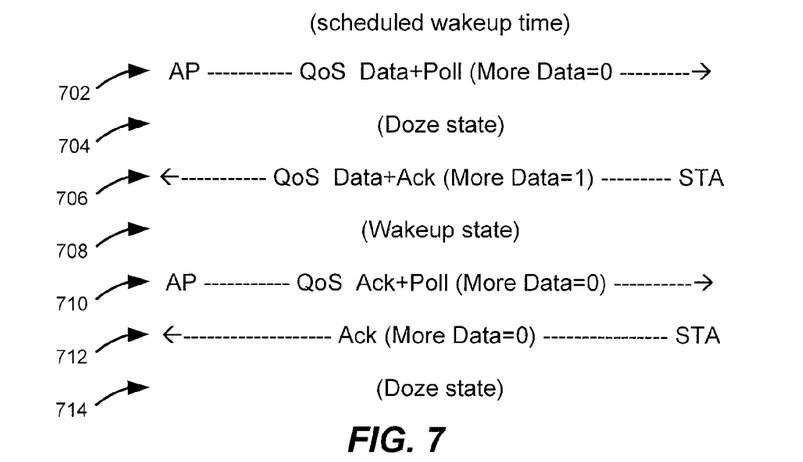
FIG. 7 is an example frame exchange sequence using a scheduled wakeup period.

Rule 3 above, supra, enables the QAP to continue polling a QSTA, with a non-zero transmit queue size, after the QAP has indicated it does not have any more downlink data, as illustrated in FIG. 7. Step 702 is the scheduled wakeup time for the station. At step 704 the AP sends a QoS Data+a Poll with the more data flag step to indicate it has no further traffic for the station. At step 706 the station responds with QoS data and an Ack with the more data flag set to indicate it has more data to send. Because the station has more data to send it remains in a wakeup state. The AP responds with a Qos Ack and a poll with the more data flag set to zero to indicate the AP has not additional traffic as shown in step 708. at step 710 the station sends QoS data and an Ack with the more data flag set to indicate the station has no more data to send. At step 712 the AP responds with an Ack with the more data flag set to indicate the AP has no more data for the station. Because neither the AP nor station has more data to send, at step 714 the station returns to a doze state.

Figure 8:
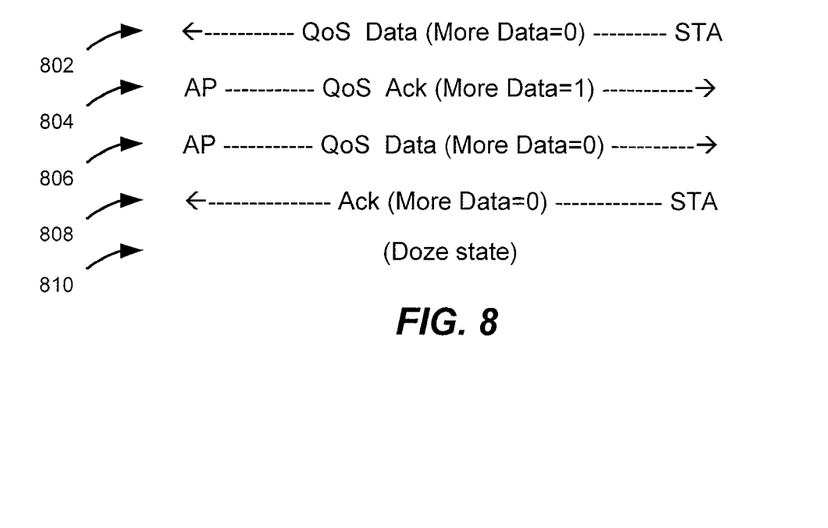
FIG. 8 is an example frame exchange sequence in an unscheduled wakeup period initiated by the station.

Rule 4 supra enables the QAP to deliver downlink frames to a QSTA in an unscheduled Wakeup Period initiated by the QSTA, as illustrated in FIG. 8. At step 802 the station sends QoS data to the AP with the More Data set to 0, indicating it has no more uplink frames. After the AP receives the QoS data sent in step 802, it sends a QoS ACK with the More Data flag set on (1) to indicate it has a buffered downlink frame for the station. Then at step 806 the AP sends the QoS Data, the More Data is set off to indicate it has no additional data. At step 808 the station responds with an ACK with the More Data flag set off, and thus at step 810 returns to the Doze state. If at step 806 the More Data flag was set on, then steps 806 and 808 would repeat until the AP has sent all the buffered frames to the station.

The Scheduled Wakeup Time (SWT) mechanism is not effective unless there is a frame transmitted at the start of each scheduled Wakeup Period. For example, if a QSTA wakes up and the AP does not transmit a frame, then the QSTA must remain awake until it receives a TIM in the next Beacon.

Figure 9:
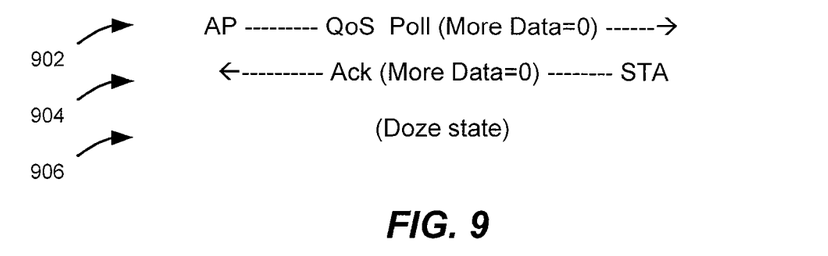
FIG. 9 is an example frame exchange sequence when neither the AP and station have data to transmit.

The Scheduled Wakeup Time (SWT) mechanism is effective for QSTAs that have established an HCF polling schedule (i.e. via TSPEC signaling) that coincides with the QSTA's wakeup schedule. Such a polling schedule guarantees that a QSTA will receive a, possibly piggybacked, poll near the start of each scheduled Wakeup Period. The scheduled poll functions much like a per-QSTA Beacon for power-save purposes. The frame exchange sequence for the case where neither the QAP nor QSTA have data to transmit is shown in FIG. 9. At step 902 the AP sends a QoS poll with More Data set off to the station. The station responds at step 904 by sending an ACK with the more Data set off to the AP. Since neither the station or the AP have frames to send, at step 906 the station returns to the Doze state.

In the example of FIG. 9, the station can return to the Doze state immediately after it receives the poll and sends the ACK, both with the More Data bit set to '0'. Note that, in the absence of the poll or other downlink frame, the rules require the QSTA to remain awake until it receives a TIM (e.g. in the next Beacon).

Figure 10:
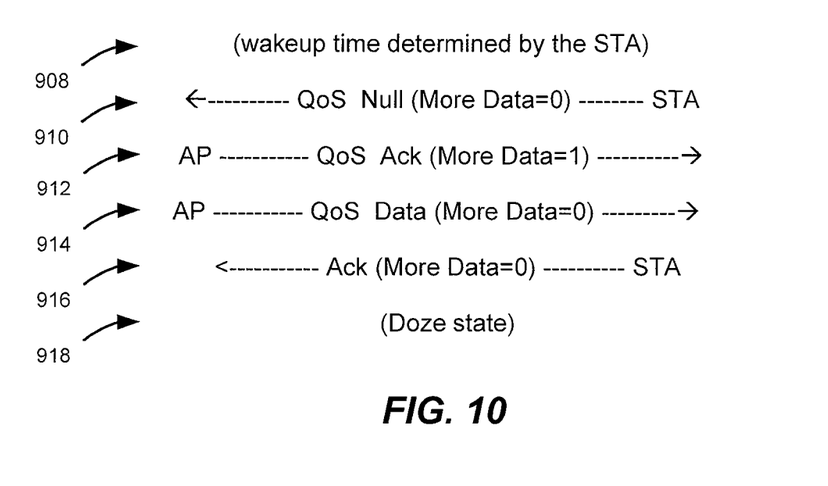
FIG. 10 is an example frame exchange sequence for a reverse poll.

In an 802.11e draft, a problem exists in the above frame exchange sequence if the ACK frame is lost. The QSTA is prohibited from using EDCF to transmit uplink frames for the "polled" QoS traffic stream. Therefore, the AP must retransmit polls to the QSTA, until it receives an expected response. Note that all poll retransmissions will also fail if the WSTA returns to the Doze state after the ACK is lost. The problem is partially addressed by allowing a QSTA to use EDCF to transmit a frame, if an expected poll is not received, so that the QAP does not have to exhaustively retransmit polls. A QAP does not need to exhaustively retransmit a poll frame, when an expected response is not received, if the access method is polled+EDCF. Polled+EDCF access also enables a QSTA to effectively "reverse poll" a QAP, for buffered power-save frames, at times and intervals determined by the QSTA. No additional scheduling or QSTA/QAP synchronization is required. The reverse polling mechanism is illustrated in FIG. 10.

As shown at step 908, the wakeup time is determined by the station. Once the station is in a wakeup state, then as shown in step 910, the station sends a QoS Null with More Data set off. The AP in this example responds with a QoS ACK with More Data set on to indicate it has more frames at step 912. Then at step 914 the AP sends the QoS Data to the station. At step 914 More Data is set off, indicating to the station that the AP has no more downlink frames. The station responds by sending an ACK as shown at 916 to the AP with the More Data set off, and then as shown at step 918 returns to a Doze state.

Implementation Considerations:

An example embodiment facilitates a simple HCF scheduler, where polls are simply queued for transmission as any other frame, or a more complex scheduler that approximates time-division multiplexing.

Beacon-based parameters in an APSD element can easily be translated to time values; therefore, the QAP can implement a single timer mechanism that supports any wakeup schedule (i.e. Beacon-aligned or unaligned). The same timer mechanism can be used to generate polls at the start of each wakeup period.

The AP can modify schedule start times and wakeup intervals, with the APSD Schedule element, to minimize overlap of Wakeup Periods. The AP can also modify Wakeup Periods to accommodate less granular timers.

A QSTA can easily change its wakeup schedule. For example, a VoIP QSTA in the standby state can establish a relatively slow wakeup schedule, where wakeup times are aligned with Beacon transmissions. The VoIP QSTA can establish an unaligned, faster wakeup schedule when it has an active call.

An example embodiment contemplates a Proxy ARP server in an AP that maintains IP/MAC address bindings for associated client stations. When an AP receives a broadcast ARP request on its Ethernet port, it searches its IP/MAC address bindings for an IP address that matches the "target IP address" in the body of the ARP request. If a matching IP address is found, the AP Proxy ARP server returns a "proxy" ARP Reply, on its Ethernet link, which contains the MAC address that corresponds to the target IP address. As an alternate solution, the Proxy ARP server can translate the destination broadcast MAC address in an ARP Request to the unicast MAC address that corresponds to the target IP address. The resulting unicast ARP Request frame can then be forwarded to the target station, as any other (i.e. power-save) unicast message, so that the station can generate an ARP Reply. Therefore, the ARP server in the AP does NOT need to generate a proxy ARP Reply.

An 802.11 client station does not need to receive broadcast ARP requests if the Proxy ARP server in the parent AP "knows" the client station's IP address. An AP can automatically determine the IP address of a client by "snooping" IP and ARP packets sent by the client station. However, a client station may not send an IP or ARP packet each time that it roams to a new parent AP. To solve the problem, a client station can register its IP address with its parent AP by including a (i.e. proprietary) IP address element in its 802.11 Reassociation Request messages. As an alternate solution, the IP address of a client station can be transferred over the network infrastructure to a new parent AP when a client roams.

An attempt to quantify the 802.11 "radio" power savings facilitated by Proxy ARP will now be described. The analysis does NOT consider the power consumption of the host computer or radio power consumption in the "sleep" state.

A power-save 802.11 station does not need to stay awake to receive power-save multicast/broadcast transmissions if a) a Proxy ARP server is generating proxy ARP Replies for the client, b) the client does not need to receive any other multicast messages, and c) the client is aware of the Proxy ARP service. The last requirement can be addressed in a couple ways. A client can be configured to rely on Proxy ARP services. However, such a solution requires manual user configuration and the client cannot roam to APs that do not provide the Proxy ARP services. As a better solution, an AP can "advertise" that it is providing a Proxy ARP service via a (i.e. proprietary) element contained in (Re) Association Response messages.

In the example analysis infra, the wakeup duty cycle is first calculated for a power-save station that must receive multicast/broadcast transmissions. The duty cycle is then calculated for a power-save station that does not need to receive multicast/broadcast transmissions. The power-save benefits of Proxy ARP are highly dependent on the client application, the amount of broadcast/multicast traffic that is forwarded onto 802.11 links, and 802.11 channel parameters and characteristics. The following assumptions are used:

1) 0.4% of a 100 Mbps Ethernet LAN is used for broadcast/multicast traffic that is forwarded on 802.11 links, which translates to a multicast data rate of 400 Kbps.*;

2) The base multicast rate is 5.5 Mbps. **;

3) 802.11 multicast frames are transmitted with short PHY headers. The PHY header is transmitted at 2 Mbps;

4) Multicast frames are delivered with DCF channel access and the CWmin value is 31;

5) Channel contention for multicast transmissions is minimal;

6) The mean multicast packet size is 500 bytes. Therefore, the multicast packet rate is 100 packets per second; and 7) The application is not generating or receiving frames.

*The amount of IP multicast traffic that is forwarded on 802.11 links can be significantly reduced by enabling "IGMP Snooping" on switches connected to 802.11 APs. "IGMP Snooping" is enabled by default on Cisco Switches. If "IGMP Snooping" is enabled on switches then the "IGMP General Query" option should be enabled on APs. The "IGMP General Query" option is disabled, by default, on Cisco APs, available from Cisco Systems, Inc. 170 West Tasman Dr., San Jose, Calif. 95134, an affiliate of the assignee of the present invention, Cisco Technology, Inc at the same address.

**Multicast/broadcast traffic is transmitted at a "base multicast rate" on 802.11 links, which is often lower than the highest rate in the "basic rate set".

Per Packet Transmission Time:

| | |
|---|---|
| The MAC header and FCS is 8 × 24 bytes = 92 bits Mbps. = | 96 usec. |
| The payload is 8 × 500 bytes = 4000 bits @ 5.5 Mbps. = | 727 usec. |
| The mean post TX backoff is 16 slot times = | 320 usec. |
| DIFS (inter-frame space) = | 30 usec |
| Total = | 1173 usec |

Total time per second=1.17 msec/packet×100 packets/sec.=117 msec/sec

Therefore, 11.7 percent of the bandwidth is used for multicast (in the absence of channel contention).

In this example, the duty cycle for a power-save station, which must receive multicast/broadcast frames, is approx. 12.0% (which includes the overhead for receiving all DTIM Beacons).

A power-save VoIP station, in standby mode, must wake up periodically to receive beacons, even if it does not need to receive multicast/broadcast. The station's bit in the TIM is set if the AP has power-save frames buffered for the station. It is reasonable to assume that a VoIP station, in standby mode, must wake up at least once every 0.5 seconds to minimize call setup latency. In the absence of contention, the station should be able to wake up, receive a beacon, and return to the doze state in 1-2 msec. Therefore, the duty cycle for a station that does not need to receive multicast/broadcast is approx. 0.2%.

In this example, Proxy ARP can potentially reduce power consumption by a factor of 50-to-1. Again, note that the most significant contributing factor is the amount of multicast/broadcast traffic—which is highly variable.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A method, comprising:
   receiving from a wireless station in one of a group consisting of an association request and a reassociation request data representative of an Internet Protocol (IP) address of the wireless station;
   advertising to the wireless station that an access point provides a proxy Address Resolution Protocol service;
   storing binding data representative of a binding between a Media Access Control (MAC) address of the wireless station and the IP address of the wireless station;
   receiving a broadcast Address Resolution Protocol request on a wired port;
   searching a set of IP/MAC address bindings for an Internet Protocol address by matching a target Internet Protocol address contained in the broadcast Address Resolution Protocol request; and
   sending a proxy reply to the broadcast Address Resolution Protocol request, the proxy reply comprising a Media Access Control address of the wireless station associated by the binding data with the Internet Protocol address located by the searching responsive to the IP address of the wireless station matching the target IP address contained in the broadcast Address Resolution Protocol request.

2. The method of claim 1 wherein the wired port is an Ethernet port.

3. The method of claim 1, wherein the access point advertises that it provides the proxy address resolution protocol service in one of a group consisting of an association response and a reassociation response.

4. An access point, comprising:
   a proxy Address Resolution Protocol server;
   a memory associated with the Address Resolution Protocol server comprising Internet Protocol bindings and Media Access Control bindings for an Internet Protocol address; and
   an Ethernet port in data communication with the Address Resolution Protocol server;
   wherein the access point receives from an associated wireless station data representative of an Internet Protocol (IP) address in one of a group consisting of an association request and a reassociation request;
   wherein the access point is configured to advertise to the associated wireless station that it is providing the proxy Address Resolution Protocol service by including data indicative of the proxy Address Resolution Protocol service via a proprietary element;
   wherein the access point stores in the memory binding data representative of a binding between a Media Access Control (MAC) address for the wireless station and the IP address of the wireless station in the memory;
   wherein the proxy Address Resolution Protocol server is responsive to a broadcast Address Resolution Protocol request received on the Ethernet port, the request comprising a target Internet Protocol address, to search the binding data stored in the memory for at least one of Internet Protocol bindings and Media Access Control bindings for an Internet Protocol address by matching the target Internet Protocol address contained in the broadcast Address Resolution Protocol request; and
   wherein the proxy Address Resolution Protocol server is configured to send a proxy reply to the broadcast Address Resolution Protocol request, the proxy reply comprising a Media Access Control address of the associated wireless station located in the search of the binding data stored in the memory, wherein the IP address for the associated wireless station matches the target Internet Protocol address.

5. The access point of claim 4, further comprising the access point indicates to client stations that it is providing an Address Resolution Protocol service so that power-save stations do not have to stay awake to receive all broadcast and multicast downlink transmissions from the access point.

6. The access point of claim 4, wherein the access point advertises that it provides the proxy address resolution protocol service in one of a group consisting of an association response and a reassociation response.

7. A method, comprising:
   advertising to an associated station that an access point is providing a proxy Address Resolution Protocol service via a proprietary element in a response to at least one of a group consisting of an association request and a reassociation request received from the associated station to inform the associated station that the associated station does not have to stay awake to receive broadcast and multicast downlink transmissions from the access point;

storing a binding of the internet protocol address of the associated station with the media access control address of the wireless station;

receiving by the access point a broadcast Address Resolution Protocol request on a Ethernet port for a target station, the broadcast Address Resolution Protocol request comprising a destination broadcast Media Access Control address and a target Internet Protocol address;

searching at least one of Internet Protocol bindings and Media Access Control bindings for an Internet Protocol address matching the target Internet Protocol address contained in the broadcast Address Resolution Protocol request;

converting the broadcast Address Resolution Protocol request to a unicast message directed to a unicast Media Access Control address corresponding to the Internet Protocol address of the associated station responsive to finding the Internet Protocol address of the associated station matches the target internet protocol address by the searching; and waiting until the associated station is awake and forwarding the unicast message to the associated station while the associated station is awake.

8. The method of claim 7 further comprising:

receiving a response to the request from the target station; and forwarding the response on the Ethernet port.

9. The method of claim 7 wherein the target station is an automatic power save delivery station, the steps further comprising buffering the request until the target station is in an awake state.

10. An access point, comprising
a proxy Address Resolution Protocol (ARP) server;
a memory associated with the Address Resolution Protocol server comprising Internet Protocol bindings and Media Access Control bindings for an Internet Protocol address;
an Ethernet transceiver in data communication with the proxy Address Resolution Protocol server; and
a wireless transceiver in data communication with the proxy Address Resolution Protocol;

wherein the access point is configured to advertise to an associated station in data communication with the wireless transceiver via a proprietary element in a response to at least one of a group consisting of an association request and a reassociation request that the access point is providing a proxy Address Resolution Protocol service;

wherein the access points stores a binding of a media access control address to the internet protocol address of the associated station;

wherein the proxy Address Resolution Protocol server is responsive to receiving from a broadcast Address Resolution Protocol request, the request comprising a destination broadcast Media Access Control address and a target Internet Protocol address, to search the memory for at least one of Internet Protocol bindings and Media Access Control bindings for an Internet Protocol address matching a target Internet Protocol address contained in the broadcast Address Resolution Protocol request;

wherein the proxy Address Resolution Protocol server is configured to convert the broadcast Address Resolution Protocol request to a unicast message directed to a Media Access Control address of the associated station responsive to the matching the target Internet Protocol address with the internet protocol address of the associated station; and wherein the proxy Address Resolution Protocol is configured to wait until the associated station is awake and forward the unicast message to the associated station through the wireless transceiver.

11. The access point of claim 10 further comprising a controller that is responsive to receiving a response to the request from the target station to forward the response to the Ethernet transceiver.

12. The access point of claim 10, further comprising:
a controller; and
a memory associated with the controller;
wherein the controller is responsive to determining the target station is an automatic power save delivery station to buffer the request in the memory until the target station is in an awake state.

* * * * *